United States Patent
Kim et al.

(10) Patent No.: US 9,393,865 B2
(45) Date of Patent: *Jul. 19, 2016

(54) STRUCTURE OF FUEL FILLER NECK TO PREVENT MISFUELING

(71) Applicant: Hyundai Motor Company, Seoul (KR)

(72) Inventors: Myeong Hwan Kim, Hwaseong-Si (KR); Bu Yeol Ryu, Hwaseong-Si (KR)

(73) Assignee: Hyundai Motor Company, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/559,845

(22) Filed: Dec. 3, 2014

(65) Prior Publication Data

US 2015/0298542 A1   Oct. 22, 2015

(30) Foreign Application Priority Data

Apr. 16, 2014   (KR) .................. 10-2014-0045176

(51) Int. Cl.
 *B60K 15/04*   (2006.01)

(52) U.S. Cl.
 CPC .......... *B60K 15/04* (2013.01); *B60K 2015/0461* (2013.01); *B60K 2015/0483* (2013.01)

(58) Field of Classification Search
 CPC ............... B60K 15/04; B60K 15/0406; B60K 2015/0461; B60K 2015/0483
 USPC ..................... 220/4.14, 86.2; 141/311 R, 312, 141/349–351
 See application file for complete search history.

(56) References Cited

U.S. PATENT DOCUMENTS

| | | | | |
|---|---|---|---|---|
| 3,580,414 A * | 5/1971 | Ginsburgh | ............ | B60K 15/04 220/86.2 |
| 3,730,216 A * | 5/1973 | Arnett | .................... | B60K 15/04 137/588 |
| 8,191,588 B2 * | 6/2012 | Hagano | ............. | B60K 15/0406 141/348 |
| 2009/0020182 A1 * | 1/2009 | Groom | ................... | B60K 15/04 141/349 |
| 2009/0188582 A1 * | 7/2009 | Hagano | ................. | B60K 15/04 141/349 |
| 2012/0211489 A1 * | 8/2012 | Walser | ................... | B60K 15/04 220/86.2 |
| 2014/0332529 A1 * | 11/2014 | Ryu | ...................... | B60K 15/04 220/86.2 |
| 2014/0352846 A1 * | 12/2014 | Ryu | ...................... | B60K 15/04 141/350 |
| 2015/0069058 A1 * | 3/2015 | Ryu | ...................... | B60K 15/04 220/86.2 |
| 2015/0102031 A1 * | 4/2015 | Yoshida | ................. | B60K 15/04 220/86.2 |
| 2015/0158380 A1 * | 6/2015 | Kim | ................... | B60K 15/0406 220/86.2 |

FOREIGN PATENT DOCUMENTS

| | | |
|---|---|---|
| EP | 2 489 538 B1 | 8/2012 |
| JP | 9-315496 A | 12/1997 |
| JP | 2013-001144 A | 1/2013 |

(Continued)

*Primary Examiner* — J. Gregory Pickett
*Assistant Examiner* — Brijesh V. Patel
(74) *Attorney, Agent, or Firm* — Morgan, Lewis & Bockius LLP

(57) ABSTRACT

A misfueling prevention system for a vehicle may include an upper housing disposed at an inlet of a fuel filler neck, a lower housing disposed inside the fuel filler neck, supported by a hinge structure in the upper housing, and rotatable by a center returning spring disposed between the upper housing and the lower housing, a stopper spring and a stopper, the stopper being rotatably disposed at one side of the lower housing in a pin structure and rotatable by a contact with a refueling gun, and a flapper spring and a flapper, the flapper having one end rotatably disposed at another side of the lower housing in a pin structure and another end lockable in a recess part of the stopper and pushed to be opened by the refueling gun when released from the recess part of the stopper.

7 Claims, 6 Drawing Sheets

(56) References Cited

FOREIGN PATENT DOCUMENTS

| | | | |
|---|---|---|---|
| JP | 2013-517170 A | 5/2013 | |
| KR | 20-0379665 Y1 | 3/2005 | |
| KR | 10-2009-0114949 A | 11/2009 | |
| KR | 10-2011-0042323 A | 4/2011 | |

* cited by examiner

STRUCTURE OF FUEL FILLER NECK TO PREVENT MISFUELING

CROSS-REFERENCE TO RELATED APPLICATION

The present application claims priority to Korean Patent Application No. 10-2014-0045176 filed Apr. 16, 2014, the entire contents of which is incorporated herein for all purposes by this reference.

BACKGROUND OF THE INVENTION

1. Field of the Invention

The present invention relates to a misfueling prevention system for vehicles. More particularly, it relates to a misfueling prevention apparatus for vehicles, which can prevent a diesel vehicle from being misfueled with a wrong fuel.

2. Description of Related Art

Generally, a fuel tank is provided in a vehicle to store fuel necessary for the combustion of an engine, and a fuel filler neck is provided at the end of an oiling pipe connected to the fuel tank to supply fuel.

Refueling guns for injecting fuel to the fuel filler neck differ in diameter and refueling speed according to the type of fuel such as gasoline or diesel.

Usually, the diameter of a refueling gun for injecting diesel is greater than the diameter of a refueling gun for injecting gasoline.

Accordingly, the fuel filler neck of a diesel vehicle has a diameter greater than the diameter of the fuel filler neck of a gasoline vehicle.

For example, the diesel refueling gun has a diameter of about 25 mm to about 31 mm, and the gasoline refueling gun has a diameter of about 19 mm to about 21 mm.

Also, the fuel filler neck of the gasoline vehicle has a diameter of about 22 mm, and the fuel filler neck of the diesel vehicle has a diameter of about 26 mm to about 32 mm.

Accordingly, since the diesel refueling gun cannot be inserted into the fuel filler neck of the gasoline vehicle and only the gasoline refueling gun can be inserted into the fuel filler neck of the gasoline vehicle, misfueling does not occur in the gasoline vehicle. However, since the gasoline refueling gun as well as the diesel refueling gun can be inserted into the fuel filler neck of the diesel vehicle, misfueling often occurs in the diesel vehicle.

In the past, diesel fuel was usually used for large-size vehicles, but small-size vehicles using diesel fuel is recently increasing. Also, due to high oil prices, since self-service gas stations are increasing, cases of misfueling a diesel vehicle with gasoline are also increasing.

Recently, as the refueling cost increases, self-service gas stations in which a driver refuels a vehicle by himself/herself are gradually increasing.

These self-service gas stations have self-refueling apparatus disposed in plurality, allowing a drive to self-refuel his/her vehicle for convenience.

However, since the gasoline refueling gun and the diesel refueling gun are provided on the same refueling apparatus and two refueling switches for selecting the kind of oil are provided on the corresponding refueling guns, respectively, a wrong refueling gun or refueling switch may be selected due to driver's carelessness. Accordingly, misfueling may occur.

Actually, when fuel is supplied into a diesel vehicle, an accident of misfueling a vehicle with gasoline often occurs. The misfueling may cause the output reduction of an engine and the damage of the engine, and may stop the operation of the engine, causing a large-scale accident. Also, misfueling may cause the damage of fuel system devices such as an injection pump.

In this regard, European Patent No. 2,489,538, Korean Utility Model No. 20-0,379,655, Japanese Patent Application Publication No. 2013-001144, and Korean Patent Application Publication No. 10-2009-0114949 disclose technologies that enable refueling by operating a stopper only when a diesel refueling gun having a large diameter is inserted.

However, the above-mentioned technologies do not consider a common diesel refueling gun having a diameter of about 31 mm, and is insufficient in terms of structure and operation. Also, there is a limitation in that an oil filling port may be opened even when a gasoline refueling gun having a small diameter is inserted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a misfueling prevent system for vehicles, which can fundamentally prevent misfueling, by implementing a new type of misfueling prevention structure in which a stopper is operated to open a flapper only when a diesel refueling gun is inserted using a diameter difference between a gasoline refueling gun and a diesel refueling gun and the stopper is not operated to allow the flapper not to be opened while the whole of a lower housing rotates when the stopper is operated by the gasoline refueling gun having a small diameter.

According to various aspects of the present invention, a misfueling prevention system for a vehicle may include an upper housing disposed at an inlet of a fuel filler neck, a lower housing disposed inside the fuel filler neck, supported by a hinge structure in the upper housing, and rotatable by a center returning spring disposed between the upper housing and the lower housing, a stopper spring and a stopper, the stopper being rotatably disposed at one side of the lower housing in a pin structure and rotatable by a contact with a refueling gun, and a flapper spring and a flapper, the flapper having one end there of rotatably disposed at another side of the lower housing in a pin structure and the other end thereof lockable in a recess part of the stopper and pushed to be opened by the refueling gun when released from the recess part of the stopper.

The lower housing may be coupled to pin seating parts on sides of an inner circumference of the upper housing through hinge pins on corresponding sides of an upper outer circumference of the lower housing, and may be rotatable about the hinge pins when eccentrically interfered with the refueling gun.

The center returning spring may be disposed between a first spring bracket extending from one side of an outer circumferential surface of the lower housing and a second spring bracket extending from one side of a lower end of the upper housing, the center spring having upper and lower ends supported by the first and second spring brackets, exerting an elastic restoring force to restore the lower housing to an original position when the lower housing is rotated.

The center returning spring disposed between the upper housing and the lower housing may have an elastic modulus smaller than an elastic modulus of the stopper spring.

The upper housing may include a stopper control piece disposed at one side thereof, and the stopper control piece may be disposed at a rear side of the stopper, causing an interference with the stopper in a rotation direction of the stopper.

The stopper may include a contact protrusion part that contacts the refueling gun at an upper part of the stopper and the contact protrusion part may be located inside the lower housing through a cut part that is formed in the lower housing.

An interval between the contact protrusion part protruding toward the inside of the lower housing and an opposite inner wall surface of the lower housing may be configured to be about 22 mm to about 23 mm.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
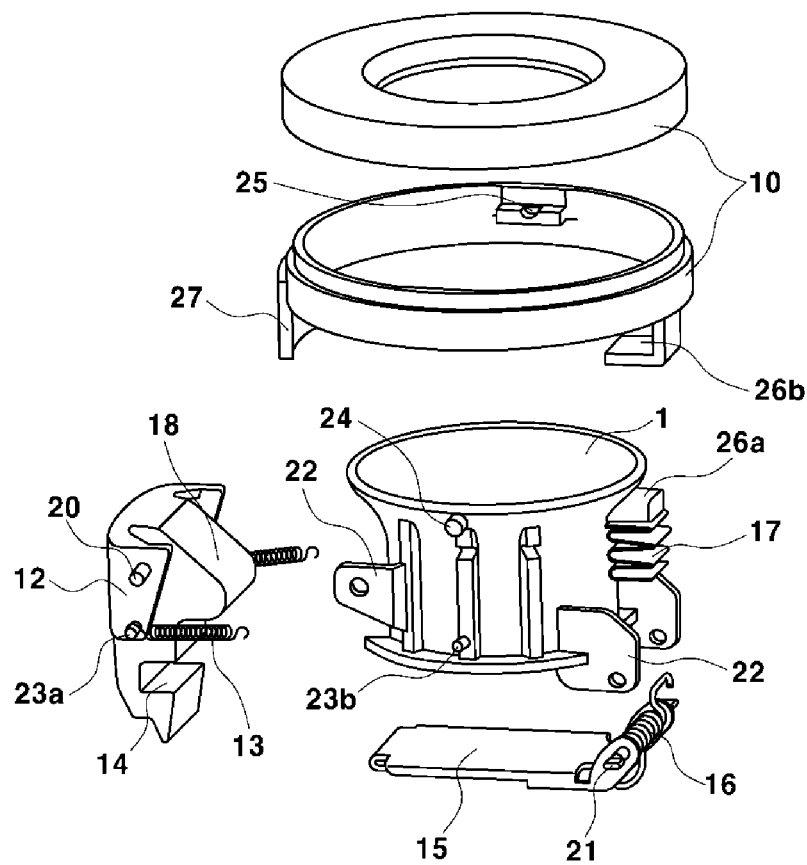
FIG. 1 is an exploded perspective view illustrating an exemplary misfueling prevention system according to the present invention.
Figure 2:
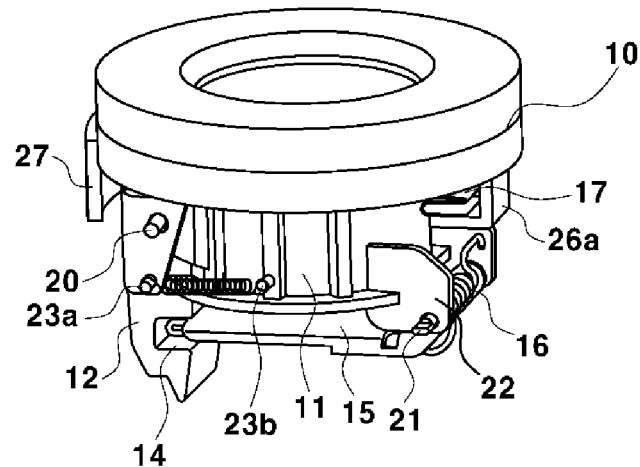
FIG. 2 is an assembled perspective view illustrating the exemplary misfueling prevention system according to the present invention.
Figure 3A:
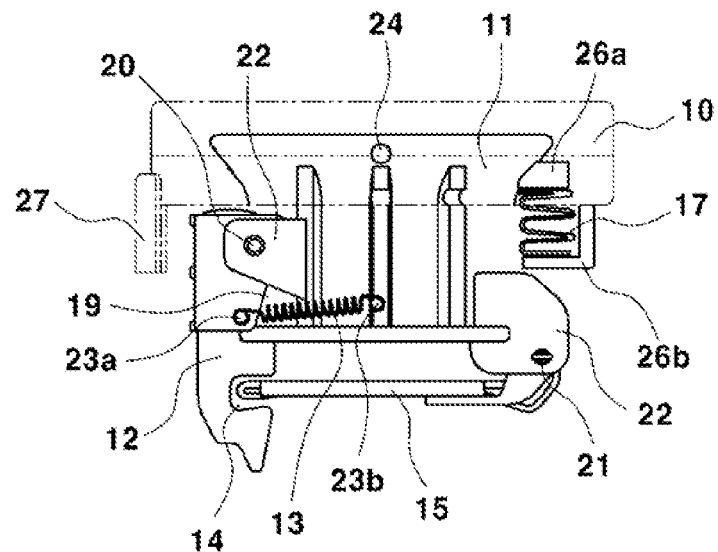
FIG. 3A and FIG. 3B are cross-sectional and plan views illustrating the exemplary misfueling prevention system according to the present invention.
Figure 3B:
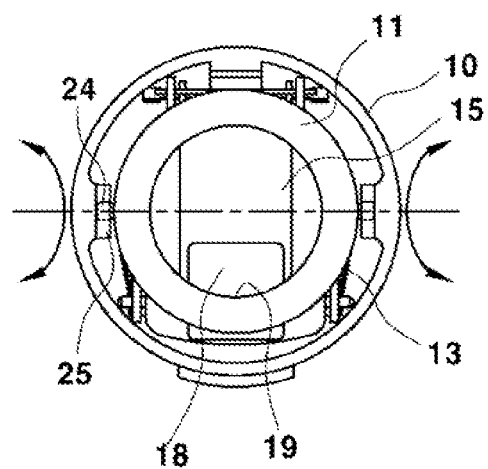

FIGS. 1 to 3 are an exploded perspective view, an assembled perspective view and a cross-sectional view illustrating a misfueling prevention system according to an embodiment of the present invention.

As shown in FIGS. 1, 2, 3A and 3B, the misfueling prevention system may open and close a fuel filler neck using a flapper opened by a stopper that selectively operates according to the diameter of a refueling gun inserted into the fuel filler neck. When a refueling gun of an inappropriate oil is inserted into the fuel filler neck, e.g., when a gasoline refueling gun is inserted into the fuel filler neck of a diesel vehicle, refueling may be blocked.

For this, the misfueling prevention system may include an upper housing 10 disposed at an inlet of a fuel filler neck for refueling, and a lower housing 11 disposed inside the fuel filler neck, fixed in a vertical direction and simultaneously rotatable in one direction, and having a cylindrical shape.

Also, the upper housing 10 may include two cylindrical housings vertically coupled to each other.

The upper housing may include a stopper control piece 27 that controls the rotation of a stopper 12 through contact with the stopper 12 at a certain location to which the stopper 12 described later is pushed.

Here, the stopper control piece 27 may be replaced with an inner wall surface of the fuel filler neck.

In this case, the stopper control piece 27 may be formed to downwardly extend from one lower edge of the upper housing 10. Since the stopper control piece 27 may be located at the rear side of the stopper 12, the stopper control piece 27 may support the rear surface of the upper end portion of the stopper 12 that is pushed to one side (side of the stopper control piece) by the refueling gun. Thus, the stopper 12 may be supported by the stopper control piece 27, preventing the whole of the lower housing 11 from further rotating.

Also, the lower housing 11 may be substantially concentrically disposed under the upper housing 10. Thus, upon refueling, the refueling gun may be inserted along the inner side of the upper housing 10 and the inner side of the lower housing 11.

Particularly, since the lower housing 11 is rotatably disposed in one direction (e.g., left-right direction or forward-backward direction), the whole of the lower housing 11 may be inclined while rotating in one direction when a refueling gun such as a gasoline refueling gun having a small diameter pushes or is eccentrically or inclinedly inserted into the lower housing 11.

For this, a hinge pin 24 may be disposed at both sides of the upper circumference of the lower housing 11. For example, two hinge pins 24 may be disposed at an interval of about 180 degrees. Also, two pin seating parts 25 may be formed on the inner circumference of the upper housing at an interval of about 180 degrees.

Accordingly, the lower housing 11 may be supported by the hinge pins 24 seated on the pin seating parts 25 of the upper housing 10. Thus, the lower housing 11 may rotate about the hinge pins 24.

For example, when the refueling gun is eccentrically inserted into the lower housing 11 to cause an interference, the lower housing 11 may rotate about the hinge pins 24 to be inclined.

Also, a center returning spring 17 may be provided to restore the lower housing 11 to the original position. When an external force is not applied to the lower housing 11, the lower housing 11 may be positioned in a vertical direction by an elastic force exerted by the center returning spring 17 while being coaxial with the upper housing 2.

For this, an upper spring bracket 26a may horizontally extend from one side of the outer circumferential surface of the lower housing 11, for example, at a location away from the hinge pin 24 by about 90 degrees and opposite to a location where the stopper 12 is disposed, and a lower spring bracket 26b may vertically extend from one side of the lower end of the upper housing 10. The spring bracket 26b may have a substantial L-shape.

The upper and lower spring brackets 26a and 26b may face each other, and the center returning spring 17 may be disposed between the upper and lower spring brackets 26a and 26b to be supported by the upper and lower end thereof.

The center returning spring 17 disposed between the upper housing 10 and the lower housing 11 to elastically support the lower housing 11 may have a relatively lower elastic modulus than the elastic modulus of a stopper spring 13 elastically supporting the stopper 12.

Accordingly, when the refueling gun pushes the stopper 12, the lower housing 11 supported by the center returning spring 17 having a lower elastic force may first move before the stopper 12 supported by the stopper spring 13 having a higher elastic force rotates.

The stopper 12 may be provided to control the operation of a flapper 15 for opening/closing the fuel filler neck.

The stopper 12 may include a contact protrusion part 18 that contacts the refueling gun at an upper part thereof, and a recess part 14 that hooks the flapper 15 at a lower part thereof. The stopper 12 may be located only at one side surface of the lower housing, and may be configured to rotate about stopper pins 20 disposed at both side surfaces thereof.

That is, the stopper pins 20 on both side surfaces of the stopper 12 may be fitted into pin brackets 22 on the outer surface of one side of the lower housing 11. In this state, the stopper 12 may rotate about the stopper pin 20 in the upward and downward directions.

The contact protrusion part 18 of the stopper 12 may be located inside the lower housing 11 through a cut part 19 that is formed in the lower housing 11. The contact protrusion part 18 that is rounded and located inside the lower housing 11 may contact the refueling gun inserted into the lower housing 11.

Also, the stopper springs 13 may be connected between spring pins 23b on both side surfaces of the stopper 12 and spring pins 23a on both side surfaces of the lower housing 11, respectively.

Accordingly, when the refueling gun withdraws, the stopper 12 rotated by the refueling gun may return to the substantially vertical position by an elastic force of the stopper spring 13, holding the flapper 15.

The flapper 15 may be provided to substantially open and close the fuel filler neck.

The flapper 15 may be disposed in a horizontal position, and may be adhered closely to a lower part of the lower housing 11. In this state, the flapper 15 may be configured to rotate upwardly and downwardly through a pin structure disposed at one side of the flapper 15.

For example, one end of the flapper 15 may be penetratively supported by both pin brackets 22 disposed at the other side (e.g., opposite to the stopper 12) of the lower housing 11 using flapper pins 21, and the other end of the flapper 15 may be located inside the recess part 14 of the stopper 12 to be stopped from moving up and down.

Accordingly, when the flapper 15 is released from the stopper 12, the flapper 15 may rotate about the flapper pin 21 upwardly and downwardly.

Also, a flapper spring 16 may be provided to restore the flapper to the original location. The flapper spring 16 may be wound around the flapper pin 21 that serves as a rotation axis of the flapper 15. One end of the flapper spring 16 may be fixed to the lower housing 11, and the other end of the flapper spring 16 may be fixed to the flapper 15.

Thus, the flapper 15 downwardly rotated by the refueling gun may be restored to the original horizontal position by an elastic force of the flapper spring 16, entering the recess part 14 of the stopper 12.

The misfueling prevention apparatus according to various embodiments of the present invention may be configured to be applicable to common diesel refueling guns having large diameters as well as diesel guns for small vehicles, thereby improving the convenience of customers.

For this, the lower housing 11 may be configured to have an inner diameter of up to 32 mm to receive both diesel refueling gun (Ø24) for small-size vehicles and common diesel refueling gun (Ø31).

Also, an interval between the contact protrusion part 18 of the stopper 12 protruding toward the inside of the lower housing 11 and a wall surface of the lower housing 11 opposite thereto may be configured to be about 22 mm to about 23 mm, enabling the diesel refueling gun (Ø24) for small-size vehicles and the common diesel refueling gun (Ø31) to contact with the stopper while avoiding an interference between the gasoline refueling gun (Ø21) and the stopper 12.

Hereinafter, an operation state of the misfueling prevention system configured as above will be described as follows.

Figure 4A:
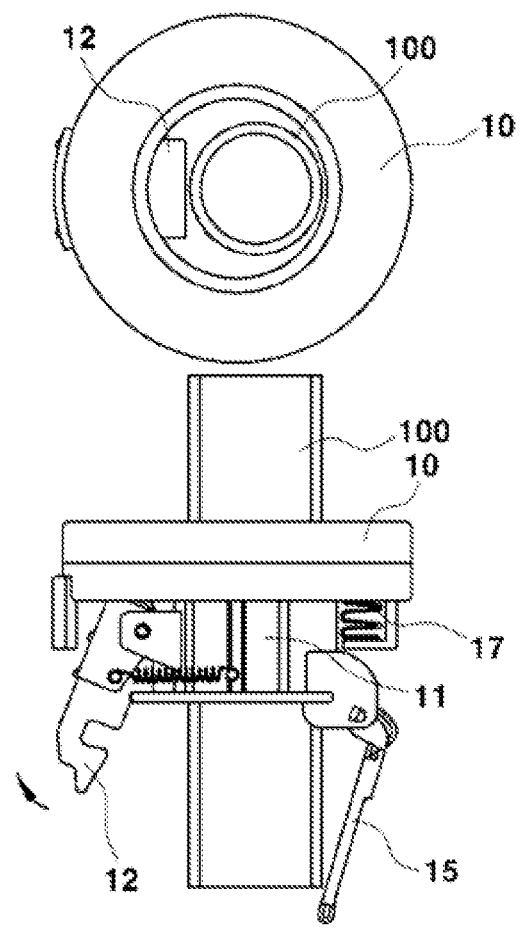
FIG. 4A, FIG. 4B, and FIG. 4C are cross-sectional views illustrating an operational state of the exemplary misfueling prevention system when a diesel refueling gun is inserted into the exemplary misfueling prevention system according to the present invention.
Figure 4B:
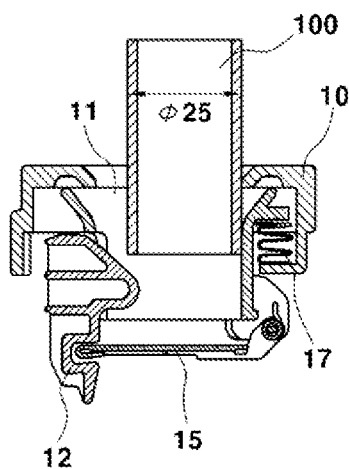
Figure 4C:
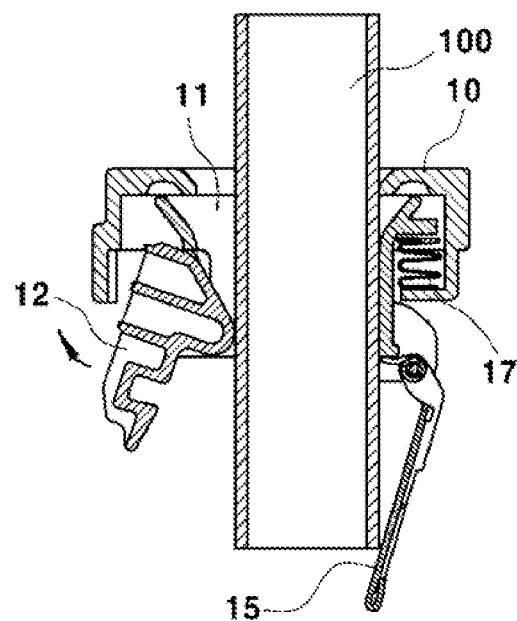

FIGS. 4A-4C are cross-sectional views illustrating an operational state of a misfueling prevention system when a diesel refueling gun is inserted into the misfueling prevention system according to various embodiments of the present invention.

FIGS. 4A-4C illustrate a diesel vehicle refueled through a fuel filler neck using a diesel refueling gun.

When a diesel refueling gun 100 having a diameter larger than the interval (e.g., 22 mm) between the stopper 12 and the lower housing 11 is inserted into the fuel filler neck, the stopper 12 may be outwardly rotated by the contact between the diesel refueling gun 100 and the contact protrusion part 18.

Simultaneously, the flapper 15 may be released from the recess part 14 of the stopper 12, and then may be downwardly rotated by a pushing force of the diesel refueling gun 100, enabling refueling by the diesel refueling gun 100.

Figure 5A:
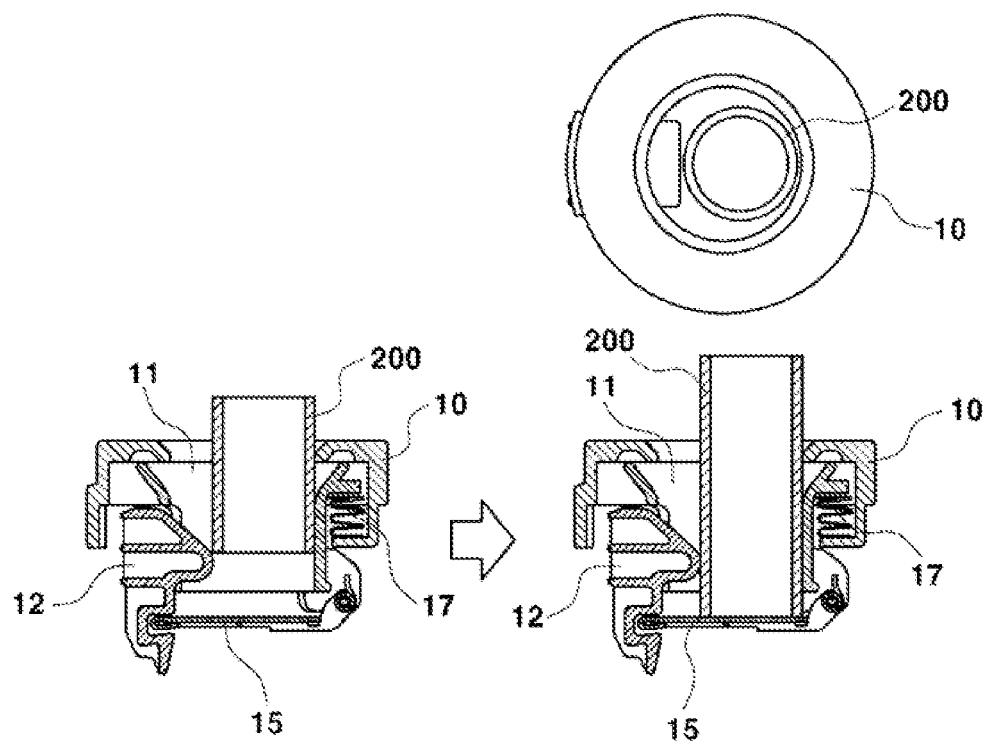
FIG. 5A and FIG. 5B are cross-sectional views illustrating an operational state of the exemplary misfueling prevention system when a gasoline refueling gun is inserted into the exemplary misfueling prevention system according to an embodiment of the present invention.
Figure 5B:
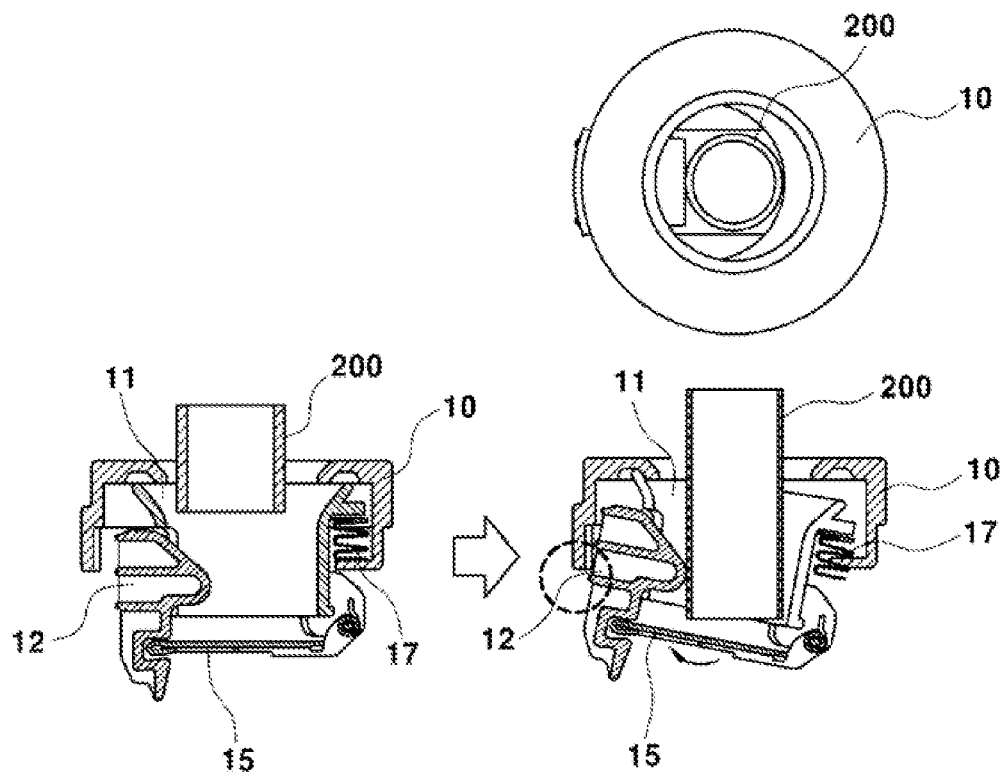

FIGS. 5A and 5B are cross-sectional view illustrating an operational state of a misfueling prevention system when a gasoline refueling gun is inserted into the misfueling prevention system according to various embodiments of the present invention.

FIGS. 5A and 5B illustrate a diesel vehicle refueled through a fuel filler neck using a gasoline refueling gun.

When a gasoline refueling gun 200 having a diameter smaller than the interval (e.g., 22 mm) between the stopper 12 and the lower housing 11 is inserted into the fuel filler neck, the gasoline refueling gun 200 may not contact the contact protrusion part 18 of the stopper 12. Accordingly, since the stopper 12 does not rotate and the locking state between the stopper 12 and the flapper 15 is maintained, refueling using the gasoline refueling gun 200 cannot be performed.

Figure 6A:
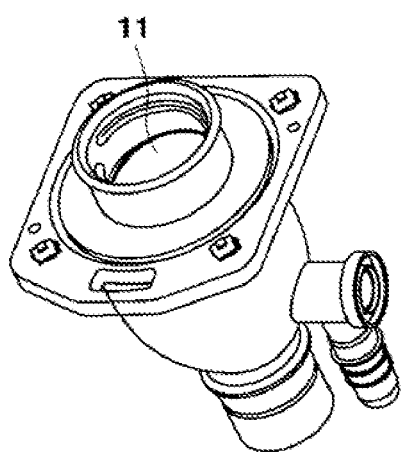
FIG. 6A and FIG. 6B are cross-sectional views illustrating an operational state of the exemplary misfueling prevention system when a gasoline refueling gun is inclinedly inserted into the exemplary misfueling prevention system according to an embodiment of the present invention.
Figure 6B:
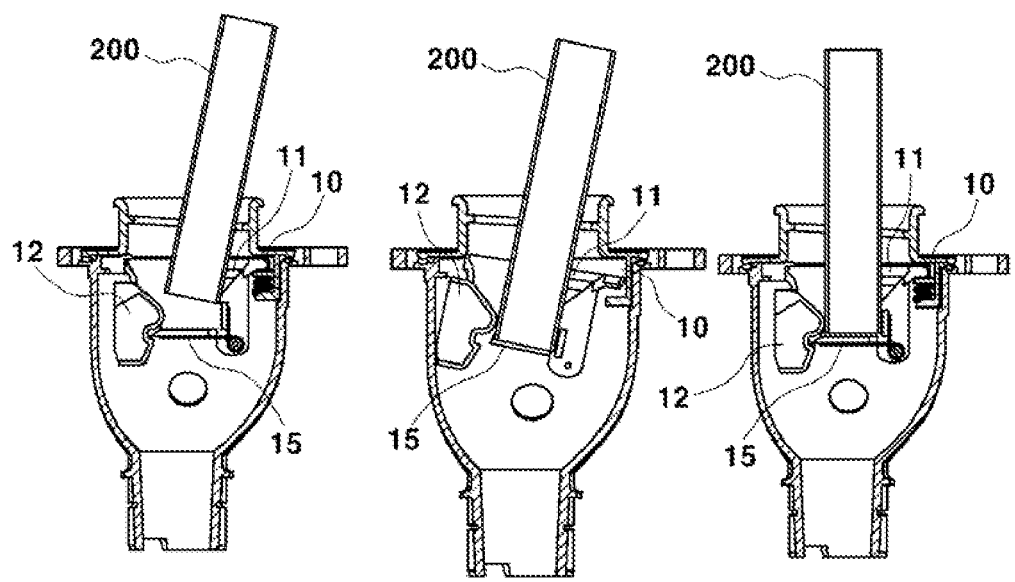

On the other hand, as shown in FIGS. 6A and 6B, when the gasoline refueling gun 200 is eccentrically inserted due to a carelessness of a refueling person, allowing the gasoline refueling gun 200 to push the bottom of the flapper 15, the whole of the lower housing 11 may rotate in the pushing direction. Consequently, the stopper 12 may not be rotated, and thus refueling cannot be performed.

Also, even when the gasoline refueling gun 200 keeps pushing down the flapper 15, the whole of the lower housing 11 including the stopper 12 is not pushed due to the stopper control piece 27 of the upper housing 10. Accordingly, the stopper 12 may not be rotated, and thus the refueling cannot be performed.

A misfueling prevention system for a vehicle according to various embodiments of the present invention has the following advantages.

First, since a stopper is selectively operated to allow a flapper to be opened according to the diameter of a refueling gun, misfueling can be fundamentally prevented.

Second, when a refueling gun for a wrong fuel is inserted, a housing itself rotates, allowing the stopper not to operate. Accordingly, a misfueling prevention structure can be implemented by a simple structure and operation method, and can actively deal with misfueling due to a mistake or poor operation of a refueling person.

Third, when the gasoline refueling gun is eccentrically or inclinedly inserted, refueling is impossible. Also, since the structure is simple, mass production is possible.

Fourth, the misfueling prevention system can be widely applied to a common diesel refueling gun (Ø31) as well as a diesel refueling gun for small-size vehicles.

Fifth, the improvement of merchantability according to the increase of customer convenience and the reduction of cost can be realized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A misfueling prevention system for a vehicle, comprising:
    an upper housing disposed at an inlet of a fuel filler neck;
    a lower housing disposed inside the fuel filler neck, supported by a hinge structure in the upper housing, and rotatable by a center returning spring disposed between the upper housing and the lower housing;
    a stopper spring and a stopper, the stopper being rotatably assembled to one side of the lower housing and rotatable by a contact with a refueling gun; and
    a flapper spring and a flapper, the flapper having one end rotatably assembled to another side of the lower housing and another end lockable in a recess part of the stopper and pushed to be opened by the refueling gun when released from the recess part of the stopper.

2. The misfueling prevention system of claim 1, wherein the lower housing is coupled to pin seating parts on sides of an inner circumference of the upper housing through hinge pins on corresponding sides of an upper outer circumference of the lower housing, and is rotatable about the hinge pins when eccentrically interfered with the refueling gun.

3. The misfueling prevention system of claim 1, wherein the center returning spring is disposed between a first spring bracket extending from one side of an outer circumferential surface of the lower housing and a second spring bracket extending from one side of a lower end of the upper housing, the center returning spring having upper and lower ends supported by the first and second spring brackets, exerting an elastic restoring force to restore the lower housing to an original position when the lower housing is rotated.

4. The misfueling prevention system of claim 1, wherein the center returning spring disposed between the upper housing and the lower housing has an elastic modulus smaller than an elastic modulus of the stopper spring.

5. The misfueling prevention system of claim 1, wherein the upper housing includes a stopper control piece disposed at one side thereof, and the stopper control piece is disposed at a rear side of the stopper, causing an interference with the stopper in a rotation direction of the stopper.

6. The misfueling prevention system of claim 1, wherein the stopper includes a contact protrusion part that contacts the refueling gun at an upper part of the stopper and the contact protrusion part is located inside the lower housing through a cut part that is formed in the lower housing.

7. The misfueling prevention system of claim 6, wherein an interval between the contact protrusion part protruding toward the inside of the lower housing and an opposite inner wall surface of the lower housing is configured to be about 22 mm to about 23 mm.

* * * * *